US008740709B2

(12) United States Patent
Prusack

(10) Patent No.: US 8,740,709 B2
(45) Date of Patent: Jun. 3, 2014

(54) LIVE TELEVISION GAME SHOW, INVOLVING THE PARTICIPATION OF PASSIVE TV-VIEWING AUDIENCES

(76) Inventor: Howard Prusack, Brooklyn, NY (US)

( * ) Notice: Subject to any disclaimer, the term of this patent is extended or adjusted under 35 U.S.C. 154(b) by 1192 days.

(21) Appl. No.: 12/628,158

(22) Filed: Nov. 30, 2009

(65) Prior Publication Data

US 2010/0160046 A1 Jun. 24, 2010

(51) Int. Cl.
A63F 9/00 (2006.01)
A63F 13/00 (2014.01)
G06F 17/00 (2006.01)
G06F 19/00 (2011.01)

(52) U.S. Cl.
USPC .......................................................... 463/40

(58) Field of Classification Search
USPC .......................................................... 463/40
See application file for complete search history.

(56) References Cited

U.S. PATENT DOCUMENTS

| | | | |
|---|---|---|---|
| 4,586,707 | A | 5/1986 | McNeight et al. |
| 5,271,626 | A | 12/1993 | Llenas et al. |
| 7,244,180 | B2 | 7/2007 | McHugh |
| 2002/0100040 | A1 | 7/2002 | Bull |
| 2002/0125637 | A1 | 9/2002 | Leis |
| 2003/0190961 | A1 | 10/2003 | Seidman |
| 2005/0059341 | A1 | 3/2005 | Damaghi |
| 2005/0240955 | A1 | 10/2005 | Hudson |
| 2006/0177027 | A1 | 8/2006 | Congdon |
| 2006/0246970 | A1 | 11/2006 | Smith et al. |
| 2007/0028272 | A1 | 2/2007 | Lockton |
| 2007/0214049 | A1 | 9/2007 | Postrel |

OTHER PUBLICATIONS

The Examiner, Regis and Kelly, http://www.examiner.com/article/i-was-a-live-with-regis-and-kelly-trivia-contest-winner-for-real. Created on Feb. 22, 2009.*
Voter participation in the American Idol show, by americanidol.com, 2 pages printed from the Internet Feb. 11, 2009. http://www.americanidol.com/faq/.
http://www.km.com/promotions/Call-In-Contest-Rules.pdf TV station with daily call-in contest, by KABBS FOX News First, 2 pages printed from the Internet Feb. 11, 2009.
Method for Playing a Large-Scale Game, Abstract of WO 9919034 (A1), http://v3.espacenet.com/publicationDetailslbiblio?adjacent=true&KC=AI&date=1999042 ..., 1 page, printed from the Internet Feb. 11, 2009.
DVD and Method of Using Same, Abstract of WO 03067499 (A1), http://v3.espacenet.com/publicationDetaiis/biblio?adjacent=true&KC=A1&date=2003081 ..., 1 page, printed from the Internet Feb. 11, 2009.

* cited by examiner

Primary Examiner — Omkar Deodhar
Assistant Examiner — Reginald Renwick
(74) Attorney, Agent, or Firm — Alexey Bakman, Esq.

(57) ABSTRACT

The game show of the present invention comprises a game show studio with a game show set, a live studio audience, at least one game host, a plurality of game show contestants, a live TV-viewing audience, at least one prize, and at least one clue, embedded into the content of the game show.
At least one potential winner is selected out of the live TV-viewing audience. Some of the game show contestants participate in the process of selection of the potential winner of the live TV-viewing audience.
The at least one potential winner out of the members of the live TV-viewing audience is contacted directly by the show on live TV. The potential winner is contacted to confirm that the potential winner is aware of the clues embedded into the content of the game show, and is thus entitled to receive the prize.

18 Claims, 3 Drawing Sheets

LIVE TELEVISION GAME SHOW, INVOLVING THE PARTICIPATION OF PASSIVE TV-VIEWING AUDIENCES

This application claims priority to provisional application No. 61/139,609, filed on 21 Dec. 2008 by the same inventor under the title LIVE TELEVISION GAME SHOW, INVOLVING THE PARTICIPATION OF TV-VIEWING AUDIENCES.

FIELD OF THE INVENTION

The field of the present invention is television game shows, and more particularly, a live television game show, involving the participation of TV-viewing audiences.

BACKGROUND OF THE INVENTION

In the last several decades, TV game shows became a major part of family entertainment in the United States and around the world. Drawing tremendous audiences from all walks of life, the first successful game shows initially brought in tremendous income to advertisers and TV stations. However, with time, the number of game shows has increased. Old successful shows are losing their novelty and appeal. And few fresh ideas are finding their way to the TV-screens. The newer shows are trying to refresh, or put a new spin on the old game concepts. Thus, TV stations are trying to attract viewers by enhancing old shows, such as "Jeopardy" with celebrity hosts, creating such shows as "Celebrity Jeopardy," for example. But slight new spins on the old ideas are not enough to keep the audiences from eventually becoming bored with the show. Bright lights and loud whistles of the new shows soon become background noise for the audiences. And large sums and shiny prizes won by Tele-contestants remain unreal and impersonal for people in front of the TV. It's fun for TV-viewers to see someone in TV-land win cars and trips, the first few times they see it. But it does not make the life for living-room fans any better. They are not part of the action, they do not get the share of the winning pie, and their roof still leaks. And this makes even the brightest shows and sweetest TV prizes dim and sour for them.

The solution to this problem, offered by the present invention, is in finding a way to keep the TV viewers personally interested and involved in the show. Attempts to keep the viewers personally interested have been made by some TV shows such as Regis and Kelly. This show at one time allowed the audience members to send in letters with their names to the show. One of these letters was then selected from the pile. The lucky sender of the letter received a prize. Such an approach was intended to keep the audience members who sent in the letter interested in watching the show, wondering whether their envelope will be picked.

However, several problems are inherent in this approach. Only the regular audience members are likely to be aware of this promotion at all. Of the audience members who know of the promotion, only a few would be willing to put in the time, effort, and cost or preparing and mailing in the participation forms. Even of those who would be willing to participate in this promotion, many would naturally have doubts as to whether their envelopes would really participate in the drawing. How do they know that the winning envelope is not pulled out of the bag containing a hundred envelopes with the same name? Such a drawing, with questionable fairness procedures, requiring effort on behalf of the audience to enter, and mostly limited to regular viewers of the show, is unlikely to attract new audiences to the show and provide any financial advantages to advertisers and broadcasters.

What is needed in the art, and what the present invention provides, is a new method of engaging the viewers into watching the show by giving viewers a vested interest in the outcome of the show. The method must allow each person, who tunes in to watch the show, an opportunity of winning a tangible prize (such as a sum of money) or an opportunity to share in the prize won by show contestants. Such an opportunity to win must be open to almost every member of the viewing public, without any requirement of pre-registration for winning, so as to encourage as many eligible people as possible, to watch the show. At the same time, the method must only reward those who remained tuned in and watched the show, preferably in its entirety. The method must also provide a clear, unbiased, and absolutely random way of selecting a winner, giving every viewer who tunes in an opportunity to win. Such a method, encouraging the maximum possible number of people to watch the show and the embedded advertisements, would greatly increase the profits for advertisers and broadcasters. The method described in present invention achieves all of these objectives and provides numerous other benefits.

SUMMARY OF THE PRESENT INVENTION

The present invention is defined by the following claims and nothing in this section should be taken as a limitation on those claims.

The invention describes and claims a live television game show and a method of playing the live television game show. The game show comprises a game show studio with a game show set, a live studio audience, at least one game host, a plurality of game show contestants, and a live TV-viewing audience. The game show further comprises at least one prize for at least one member of the live TV-viewing audience and at least one clue, embedded into the content of the game show and broadcast to the live TV-viewing audience.

At least one potential winner is selected out of the live TV-viewing audience. Some of the game show contestants participate in the process of selection of the potential winner out of the live TV-viewing audience.

The at least one potential winner out of the members of the live TV-viewing audience is contacted directly by the show on live TV. The potential winner is contacted to confirm that the potential winner is aware of the at least one clue embedded into the content of the game show and is thus entitled to receive the prize.

DESCRIPTION OF THE PREFERRED EMBODIMENTS

Figure 1:
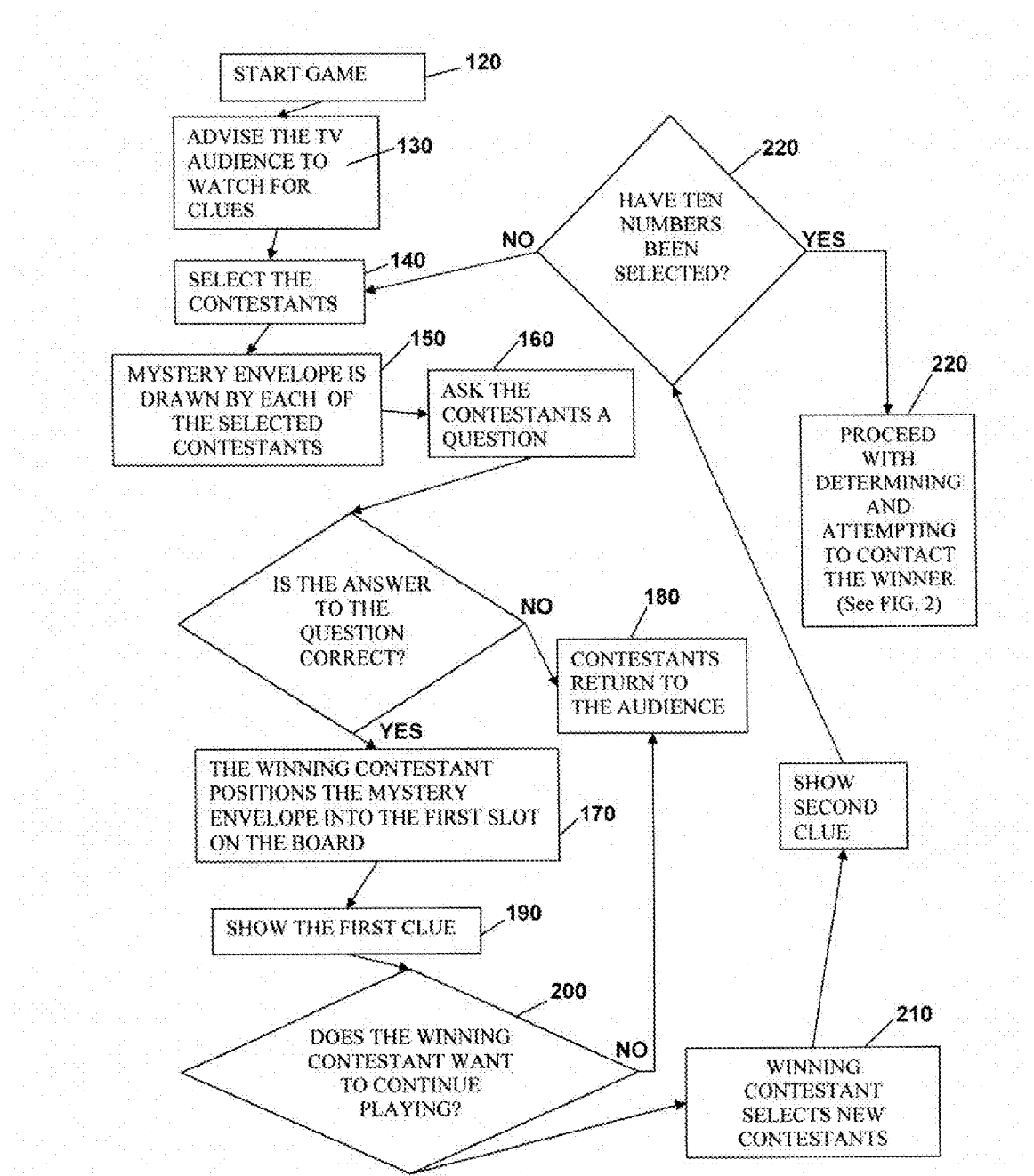
FIG. 1 is a flow chart, illustrating the steps of the game and the role of the in-studio contestants in generating the random ID number in the preferred embodiment of the live television game show of the present invention.

The live television game show of the present invention, as well as the method of playing the live television game show will now be illustrated by reference to the accompanying drawings.

The basic ideas behind the present invention is the way of encouraging the broadest possible audience to tune in and watch a show in its entirety, thus maximizing the profits of advertisers and broadcasters. The way to achieve this goal is by providing every TV viewer an opportunity of winning a prize, or sharing in the prize won by the contestants. Unlike the game shows and challenges of the prior art, that allow the active members of the TV-viewing audience to win prizes after calling the show, registering, or sending in the answer, the game and method of the present invention allow a passive member of the TV-viewing audience to become a winner, without any need to pre-register for participation.

In the broadest embodiment of the invention, almost every passive member of the broadcast audience can become a participant in a kind of a lottery/raffle just by the virtue of being a broadcast audience member and being identifiable by one of the numerous possible identifiers (preferably, a telephone number, but also other possible identifiers, such as address, DOB, ID#, license plate, etc.). Thus, just by tuning in, a broadcast audience member receives a vested interest in watching, reading and/or listening to the broadcast, as such a broadcast audience member automatically becomes a potential winner.

In the preferred embodiment of the invention, the method is implemented in a live TV game show, such as the one described below. However, the method may be implemented in a variety of other live TV game shows and other live TV, radio, Internet, and other live media broadcasting/programming.

The live television game show of the present invention will be referred to as the game show 10. Other elements or steps of the method have been assigned the reference numerals referred to below.

In the preferred embodiment, game 10 comprises a game show set, a live studio audience present in the game show studio, at least one game host, a plurality of game show contestants, and a live TV-viewing audience that comprises a plurality of members of the live TV-viewing audience. The game also comprises at least one prize (otherwise referred to as the TV prize) for at least one member of the plurality of members of the live TV-viewing audience (otherwise referred to as the TV winner). The TV winner's eligibility to win the TV prize is dependent on noticing at least one clue, embedded into the content of the game show and broadcast to the live TV-viewing audience.

Although the game show set will differ from embodiment to embodiment, in the preferred variant of the invention, the game show set comprises 10 chairs and a board with 10 slots. The slots are capable of holding and displaying an envelope or a card. Similarly, any number of the game show hosts may be present, but the inventor prefers to have two show hosts, and preferably the team of Penn and Teller. This team is preferred, since Teller does not speak, and would thus be the ideal candidate for displaying the visual clues, claimed and discussed below.

The plurality of game show contestants comprises approximately 100 people in the preferred embodiment. Millions will be watching the game show live on their TVs, and are referred to as live TV-viewing audience, the TV audience, or the TV viewers. Each member of the TV audience as a potential TV winner, eligible to win the TV prize. The term "TV prize" refers to a wide variety of potential prizes, including vacation trips, educational opportunities, cars, electronics, etc. Preferably, however, the TV prize refers to a monetary award.

The at least one clue (the clue) refers to any number of clues that may be embedded into the context of the game or the advertisements, associated with the game. Preferably there are two clues, and both clues are visual. But in other embodiments, there will be a varying number of clues, some of which will be audio clues. The TV viewers will be encouraged to watch the clues, and thus watch the show and the advertisements more attentively. Knowledge of the clues will determine the final eligibility of the potential TV winner to win the TV prize. Since almost every TV viewer of the game may be selected as a winner, all the TV viewers will be encouraged to watch the show more attentively.

In the preferred embodiment, the inventor envisions the use of the clues as follows. At or around the halfway point (or, in other embodiments, at another point) in the show, the host of the show will pick an envelope with a name in it and will show the name to the audience/TV audience. This name will be the clue. The game will continue. After the game is completed (preferably, when all ten spaces in the board are filled with envelopes), the host will pick another envelope with another name and again show it to the audience/TV audience. This will be another clue. In the preferred embodiment, there are two clues announced, or, preferably, displayed during the show. Clues that are presented silently will encourage the viewers to watch the show, and not merely listen in to it. Preferably the clues are shown in different portions of the show (one near the beginning of the show, the other closer to end), but at different times during every show. In some embodiments, one or more of the clues may even appear during the commercials. This way the viewers will be forced to see the entire show and will not be able to tune in at certain times just to get the clues. In other embodiments there may be more or less than two clues. There may also be a different number of clues in each show, so that the TV audience will remain alert until the end of the show.

Preferably, the clues will be developed in the course of the game, although they may be prepared in advance. For example, a host or an audience member (preferably as independent a party as possible), may blindly pull the clue out of a container, such as a hat, a drum, a box of envelopes, etc. The container preferably contains a number of clues, so that a clue that gets pulled out is random. It may be a name, a number, a cartoon character, a logo or a slogan of an advertiser, or any other expression, object or a depiction of an object that is easy to remember.

The method of the preferred embodiments of the present invention comprises, among other steps, three basic steps. The first basic step involves the generation of a random ID number (reference number 110, referring in general to the steps depicted on FIG. 1) during the live broadcast of the game show. The random ID number consists of a preset number of digits, and identifies at least one potential member of the plurality of members of the live TV-viewing audience. That is, the number identifies potential TV winners (preferably one winner) out of the TV-viewers passively watching the show.

Preferably, the random ID number has the same number of digits as a telephone number (that is, for embodiments of the game show being aired in the US—10 digits, including first three digits standing in for area code), and can, in later steps, be dialed as a phone number, thus identifying the TV winner. The TV winner may be (and preferably is) an individual who picks up the phone, or all of the users of the telephone number.

The random ID number is generated by two or more of the plurality of game show contestants. Preferably, the random ID number is generated by as many game show contestants as possible to avoid any suspicion of foul play among the TV viewers. In the favored embodiment, described below, up to 100 people may be eligible to participate in the generation of the random ID number during the game show.

The step of the random ID number generation 110 is integrated into and preferably takes up most of the time of the game show. This step involves a number of substeps, defining the in-studio portion of the game, illustrated on the flowchart of FIG. 1, and described in detail below.

Another step involves broadcasting of at least one clue, live, during the show, as previously discussed.

The third major step involves the attempt by the games show to contact the at least one potential member of the plurality of members of the live TV-viewing audience (the potential TV winner, that is). This potential TV winner is identified by the random ID number, generated during the show. The attempt to contact the potential TV winner must be made during the live broadcast of the game show. This step is illustrated in detail on the flow chart of FIG. 2. Whether the potential TV winner becomes the actual TV winner will be determined by the ability of the game show to reach the potential TV winner during the broadcast, and the potential TV winner's knowledge of the clues.

In the preferred embodiments, the active part of determining the potential TV winner and contacting the potential TV winner is undertaken by the Game Show. The potential TV winner may remain passive, with no need to pre-register or call the game show, until first contacted by the game show.

The Generation of the Random ID Number

The generation of the random ID number is initiated with the beginning of the game 120. Preferably, the TV host begins by introducing the game and advising the TV viewers that each of them is a potential TV winner (the term TV winner refers to individual, as well as to group winners, and may refer to all users of a certain phone number). The host also preferably advises the TV viewers to watch for clues 130 that may appear at any time during the show.

The game show then proceeds with the selection of an at least one contestant (preferably several contestants) out of the plurality of the game show contestants. This step may include calling up the previously pre-selected contestants. Preferably, however, the talk show host selects a number (preferably 10) contestants out of the live studio audience. The lucky contestants may be chosen as a result of a blitz audience competition, or by any other criteria the game show producers deem appropriate.

The contestants will be required to generate at least one of the digits of the random ID number. The at least one digit (and preferably one digit) generated by the contestant is preferably contained in a mystery envelope. In the preferred embodiments, the mystery envelope is randomly drawn 150 from a plurality of mystery envelopes by the at least one contestant.

This is preferably achieved in the following way. There will be a table on the stage with ten mystery envelopes on it. Each contestant will walk up to the table and pick one envelope. There will also be 10 chairs on the stage. The contestants will then sit down. The host will ask one question 160. The first person to answer the question correctly of the original ten people will then take his or her mystery envelope and put it on the board 170. The board will have ten slots, the slots intended to hold ten envelopes. Each envelope contains a digit. In the preferred embodiment, the winning contestant will position the mystery envelope with a digit inside into the first available slot. Later on, another contestant will place another mystery envelope into the next slot. This will constitute the positioning the at least one of the digits of the random ID number in a sequential order, so as to form the random ID number. The fact that the random ID number will be generated during the live broadcast of the game show, by several different participants, ensures that no foul play in generating the number is involved.

In other embodiments, the winning contestants may position the envelope into a random available slot. In yet other embodiments, the generation of the digits and the positioning of the digits of the random ID number in a sequential order may be achieved by means other than the mystery envelopes. For example, the studio contestants may generate the digits by spinning a wheel, containing ten digits, from 0 to 9. The numbers selected by the winning contestants will then be positioned in sequential order to determine the random ID number (and thus the potential TV winner). A multitude of other ways of generating random digits may be used in alternative embodiments, these ways well known to those skilled in the art.

The contestants who answers the question correctly will have the option of continuing to play the game. The nine other people who did not win will be asked to return to the audience 180.

At any time during the life broadcast, preferably at unpredictable times, the clues may be broadcast 190 to the TV audience.

The game show will continue with the winner of the first round being asked if he wants to continue playing 200. The decision of whether to continue playing preferably contains a dilemma, where the winning studio contestant stands to win more money if he wins again, but stands to lose the money already won if he does not win. If the winner of the previous round wants to keep playing, nine more studio contestants will be picked from the audience. In the preferred embodiment, the winner of the previous round, selects the nine participants of the next round 210.

The nine people plus the one who answered the previous question correctly will walk onstage, approach the table and pick one mystery envelope each from a new set of ten mystery envelopes. The contestants will sit down and will once again be asked a question. The one who answers the question first will then take his or her envelope and put it on the board. The winner will then be asked if they wish to continue playing the game. If he or she says yes, they will continue to the next round. If they choose not to continue, the winning contestant will then pick new people from the audience to move on to the next round.

The loop will continue for the sufficient number of times to generate the random ID number with the preset number of digits. That is, in the preferred embodiment, where the random ID number is a telephone number with 10 digits, the loop will run 10 times, ten rounds of the game. This will allow nearly 100 people from the studio audience to participate in the game and have a chance at winning the prizes and selecting one of the digits for the random ID number.

The incentive for the studio winner of the previous round to continue with the game is that the winner stands to win progressively larger prizes. For example, in the preferred embodiment, the person who wins will have a chance to double (otherwise multiply) their money if they win again.

In the preferred embodiments, the person who won in the previous round will be given a 1-5 seconds advantage to answer the question before the 9 other contestants do. In some embodiments this can be done by locking out the 9 other signaling buttons. This advantage in the next round may encourage the player to elect to go on to the next round.

Contacting the Potential TV Winner

Figure 2:
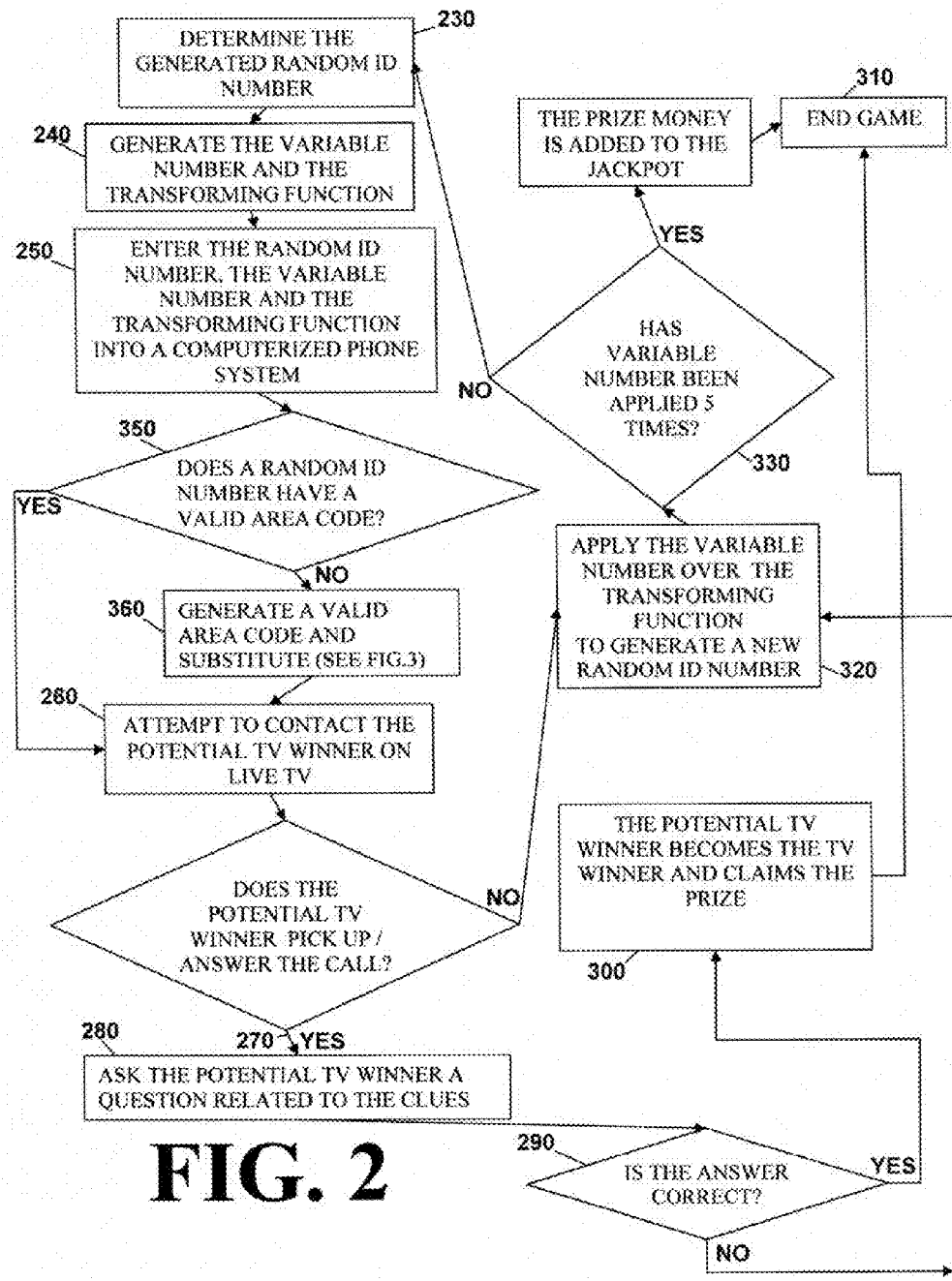
FIG. 2 is a flow chart, illustrating the contact of the game show with the at least one potential member of the plurality of members of the live TV-viewing audience.
Figure 3:
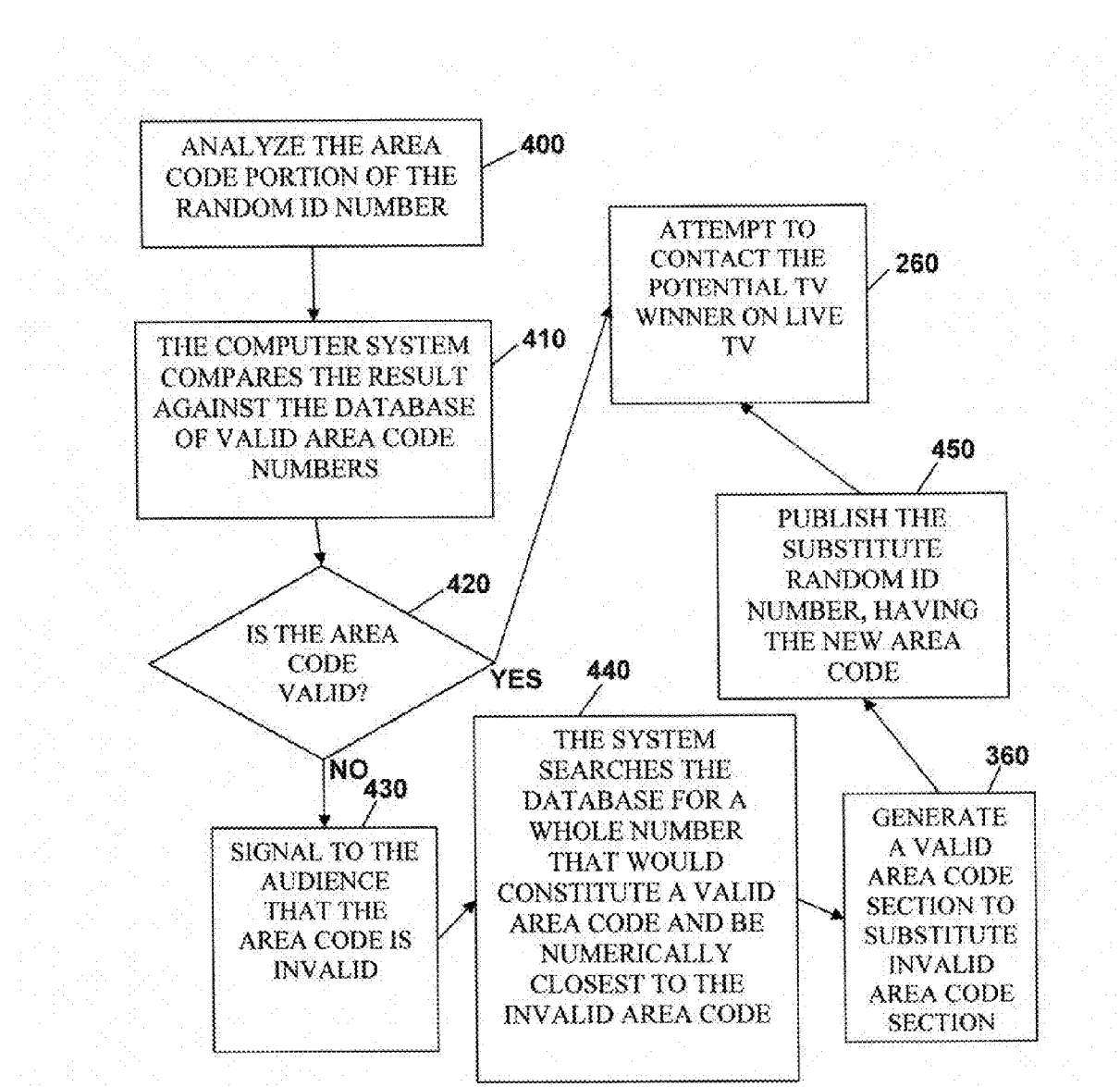
FIG. 3 is a flow chat, illustrating the computerized process of determining the validity of the random ID number as a telephone number.

Once ten envelopes have been placed in the slots on the board (or once ten digits were chosen by any other means), the game proceeds to the next stage, illustrated in FIG. 2. The stage begins with determining the generated random ID number 230.

For this, in the preferred embodiment of the invention, the board, containing the mystery envelopes, has a light behind it. When the light is turned on, the board lights up and the envelopes become transparent, allowing the number/digit contained in that mystery envelope to show through. Thus the random ID number becomes apparent.

In the preferred embodiments of the invention, including the embodiment illustrated in FIG. 2, the game show further comprises a variable number, and a transforming function. The variable number and the transforming function are preferably generated 240 after the random ID number has been generated. However, in other embodiments, the variable number, and a transforming function may be predetermined or determined simultaneously with the random ID number. The variable number may be any integer, randomly selected, from 1 to 9. The transforming function is a mathematical function, and preferably one of the three functions randomly determined: addition, subtraction or multiplication, although it can be any other function in other embodiments.

The variable number and the transforming function may be generated in a number of ways. In the preferred embodiment, the variable number and the transforming function are generated by the winner of the last round of the game show by spinning two wheels, one containing the nine digits, and one containing the three mathematical functions.

The determined random ID number, containing 10 characters (3 for area code and 7 for telephone number) are then preferably entered into a game show computer system 250 for attempting the contact with the potential TV winner. In the preferred embodiment, the game show computer system attempts to contact 260 the at least one potential member of the plurality of members of the live TV-viewing audience identified by the random ID number, by placing a phone call, using the random ID number as the phone number. The computer system is preferably programmed to ring a preset number of times (preferably four times). If someone picks up the phone 270, the game show host is automatically connected with the person answering the phone. The person answering the phone is the potential TV winner.

The game show host then introduces himself. The host preferably does this by asking a trademark question, such as: "Are you feeling Greedy?" The question may be different, of course, but preferably known to those who regularly watch the show. The response may also be preset, indicating that the potential TV winner is aware of, or is watching the show. The host then asks the potential TV winner a clue-related question 280.

For instance, in one of the embodiments of the game show, the first clue shown is "Washington" and the second clue is "Booker T." In this case, the clue can be any name picked at random from a pile of names, or an actual famous name. In other embodiments of the invention, the names may be the names of the advertisers/sponsors for the show, or an answer to some "audience" questions posed during the show.

In the preferred embodiment of the game show, the game host asks the potential TV winner a simple question, such as asking him/her to name all the clues shown, to ensure that the potential TV winner watched the show from the beginning to end. Alternatively, the question may test the general knowledge of the potential TV winner and may require knowledge of additional facts. For example, the host may ask: "What year, was the person named in the clues born in?" In some embodiments the potential TV winner may be given a certain amount of time, such as 30 seconds, to find out the answer.

Since the names/clues in the preferred embodiment are shown on TV and not spoken, the audience will have to be watching, not just listening to, the entire show. If the person on the phone gives the two names/clues, or otherwise answers correctly 290, he or she will win a financial prize 300 and the game show ends 310. This TV prize, if monetary, is preferably equivalent to the amount of money that the studio contestant will win. Alternatively, the TV prize may be a certain preset lump sum, a jackpot amount, consisting of all the previously unclaimed wins from prior shows, or any other prize.

If the potential TV winner does not answer the phone, does not answer the question correctly, or the random ID number selected constitutes an invalid telephone number, the computer system proceeds with instantly generating an alternative random ID number 320.

The alternative random ID number is generated by applying the previously-determined variable number over the transforming function to each individual digit in the random ID number. This is done in order to transform the random ID number into a the new random ID number, also referred to as the different number, or the alternative random ID number (the alternative random ID number, having the same number of digits as the random ID number).

For example, let's assume that the hypothetical random ID number (telephone number in this instance) is 212-123-4567. The variable number is determined as two, and the transforming function is addition. The game computer system will initially connect the TV host with the number 212-123-4567 and let the phone ring for a maximum of four times. If someone picks up the phone, the host will ask "Are you watching 'Greedy'?" If they respond by providing the names/clues correctly, the potential TV winner becomes the actual TV winner and wins the prize. If the phone rings and no one picks up, the computer system instantaneously applies the previously-determined variable number over the transforming function to each individual digit in the random ID number. Thus, the system takes the original random ID number 212-123-4567 and adds the variable number of two (2) to every digit of the initial random ID number, making the new number: 434-3456789.

The computer then connects the host with the newly-generated number. If no one answers, the computer will transform the second number into a third number using the number two as the variable number. The new number is now: 656-567-8901. The process of generating new phone numbers and calling them is repeated a predetermined number of times or until the host reaches a viewer who can provide the clues and/or answer the question. Since the process of applying the variable number over the transforming function radically changes the phone number, including the area code, the TV audiences will remain in suspense, even if the first number chosen is not their phone number. The area code and the number may radically change and become their phone number after several transformations.

In the preferred embodiment, if the host makes five phone calls 330 (a different number in alternative embodiments) and no one answers, or no one answers correctly, the no money will be given out during this game, and the game is over 310. In the preferred embodiment the amount of money not won by the TV audiences will be added to the jackpot to be given out to a lucky TV viewer during the next show, or one of the next shows. It is foreseeable that at times, the jackpot may become a considerable sum of money, prompting more and more viewers to tune to the game show.

It must be noted that although in the preferred embodiment, the random ID number corresponds to the phone number, in other embodiments, the random ID number may be used to identify other means of communication with the TV viewers. For example, in some alternative embodiments, the random ID number may be an electronic message address (such as a text message address, or an e-mail address), the cable box receiver number, or another instant contact number, using technologies now known or later developed to which the notification of winning may be sent. It should also be noted that in some embodiments of the game show, the random ID number may contain letters and/or other characters, in combination with or without the numerical digits/integers.

In the preferred embodiments where the random ID number corresponds to the phone number, it may often be the case that the phone number (i.e. the random ID number) generated during the game show is obviously not a valid phone number. For example, a randomly generated random ID number may begin with such three digits as 911 or 555. Obviously, no US phone number begins with an area code 911 or 555 (a code used for fictional phone numbers, shown on TV). Dialing such a number from the TV show and waiting, on live TV, for someone to answer, would be at best a waste of valuable time. Therefore, some of the preferred embodiments of the game have a way of avoiding such a call.

In such embodiments, the generated random ID number is entered into a computer system 250 (also referred to as a computerized phone system). Preferably, the generated digits are entered into the system automatically, as they are generated. In other variants of the invention, the random ID number may be entered into the computer system manually by a human operator (such as a game show host). The random ID number is entered 350 into the computer system for the purpose of analyzing 400 the area code portion of the random ID number. For US-based versions of the game, the term "area code portion of the random ID number" refers to the first three digits of the random id number. In other countries and other embodiments of the game, the number of digits may be other than three, depending on the type of the area code used in that country.

The computer system comprises a database of valid area code numbers. The computer system then proceeds with analyzing the digits in a section of the random ID number that positionally corresponds to the area code portion of a telephone number (that is, usually the first three digits of the random ID number). Thus, if the random ID number is 911-123-4567, the computer system analyzes the first three digits (911). The computer system then compares 410 the result against the database of valid area code numbers to see whether those digits of the random ID number that are positioned to correspond to the area code portion of a telephone number (i.e. the first three digits) correspond to a valid telephone area code number 420.

The term "valid telephone area code number" refers to area codes that exist as residential area codes. In the preferred embodiments, valid telephone area code numbers are also limited to those in the areas where the show may be broadcast. For example, the show is being broadcast only in the United States, or show producers want to limit prize winners to those residing in the United States (to avoid legal or language issues). The random ID number begins with "204," a combination of numbers that corresponds to a Canadian area code. Such an area code will be considered as invalid (if show producers do not want any prize-winners outside the United States), and identified as such by a computer system on live TV in the preferred embodiment.

In the preferred embodiment, if the area code generated as part of the random ID number is a valid area code, the host (through the computer system), will attempt to contact the winner 250. If the winner does not pick up, the host (using the computer system) will proceed with generating an alternative random ID number, as described above.

Preferably, in cases where the area code is considered to be invalid by the computer system, the system will give a signal to the audience 430 (e.q. announce with a buzzing sound or a visual signal, such as a red lamp). The computer system will then proceed with evaluating the digits of the random ID number that are positioned to correspond to the area code portion of a telephone number (i.e. the first three digits) as a numerical value by the computer system. That is, the digits 9-1-1 (nine, one, one), will be interpreted as the number 911 (nine hundred eleven).

The system then proceeds with substitution 360 of the digits of the random ID number (now a three-digit numeral) with a valid telephone area code number, taken from the database of valid area code numbers. The new, valid area code number chosen will be the one with the closest numerical value to the original area code digits. For example, the area code 911 will be recognized by the system as an invalid area code. The system will then search 440 for the nearest whole numbers to 911 (nine hundred eleven) that are valid area codes. If either number "912" or "910" exists as a valid area code, the original number 911 will be substituted with one of those numbers if one of them is a valid area code.

It so turns out that both area codes 910 and 912 exist and are valid area codes. In this case, as second set of priorities will be utilized. Preferably, the greater number will be selected. The original invalid 911 area code will thus be substituted (360) with a valid area code 912 for Savannah, Ga. The substitute random ID number with the new area code will then preferably be published 450 (i.e., printed, announced, or otherwise made known) to the audience, preferably by being announced by the host (although it may be published by lighting up on the computer system, by being translated on the TV screens, etc.)

Although the example above demonstrates the approach as used to analyze and transform the area code portion of the random ID number, in some non-preferred embodiments of the invention, the approach may be used on the entire number. That is, instead of the system comprising a database of area codes, the system may comprise a database of valid telephone numbers that may be used to evaluate the validity of the generated random ID number (phone number).

It must also be noted that certain variations in the rules of the game show exist in various embodiments of the invention. For example, in one embodiment of the game show, at least some of the mystery envelopes from the plurality of mystery envelopes comprise a wild card, positioned inside of the mystery envelope.

In this embodiment, the mystery envelopes that the in-studio contestants pick up, have two smaller envelopes in them. One envelope will have a number contained in it, ranging from zero to nine. This first envelope will be put in the number rack and form a digit in the random ID number.

The other envelope could be empty, or have a wild card inside. The wild card in one of the embodiments has the word "Greed" on it. The "Greed" wild card indicates that the contestant automatically wins this round and can move on to the next round. If the contestant decides to continue, he will pick one mystery envelope from the next set of ten, sit down in seat number one, and may pick out nine new contestants. They will come to the table, each one picking a new mystery envelope and sit in the next nine chairs. Contestant number one from the last round who could potentially have the 'greed' envelope is asked to show the contents of the envelope. If the card in the envelope says 'greed,' the nine other contestants are told to return to the audience and the contestant number one, with the "greed" card, goes to the next round and the game continues. In the embodiments of the game that have "greed" card, three greed cards will be placed in every ten envelopes, making the odds of getting a 'greed' card three in ten.

In some embodiments of the game show, all potential TV winners are entitled to some prize. Thus, if the viewer can only name some of the clues and/or gives the wrong answer, he may be given a bonus trivia, or become entitled to a consolation prize, such as a trip to the studio to become the participant of the next show.

It is preferred that the show, when broadcast in the United States, be broadcast live, preferably during prime time from the east coast location (such as New York). This way, if the show is broadcast live at 10 PM Eastern Time, 7 PM Pacific Time, sufficient audiences will be able to watch the show across the country.

The game show and the method of the present invention can be replicated in any country. Of course, adjustments will be made in other countries for the number of digits in the phone numbers and/or other ID numbers. In countries where telephone numbers and/or license plates contain letters, other numbers such as passport numbers can be used. In such cases, the support stuff of the show will have to instantly determine the telephone number of the winning passport holder, so that the winner may be contacted instantaneously on live TV.

It is important that the game show be conducted live (at least the initial airing), so that immediate and direct interaction with TV viewers is possible. It is also very important that the random ID number and (in some embodiments) clues for the show are randomly selected during the show to assure the TV audience that no foul play is possible and that every viewer has a chance to win. Every viewer will thus be enrolled into a kind of a free lottery, with nothing to lose, and where watching the show becomes the only investment necessary for a chance to win. As no pre-registration is necessary to become a winner, this will encourage more and more new viewers to tune in for the show, just in case. Once the show goes on air, the stories will spread of the people who were contacted by the show for a chance to win large sums of money, but did not, only because they were not watching. Such stories will attract more people, who will watch the show "just in case."

It must be emphasized that in the preferred embodiment, no action is required from the main winner of the show other than watching the show and noting the clues. There is even no need to contact the show. He or she will be contacted by the show during the show. Otherwise, the winner may remain passive.

It is to be understood that while the game show and the method of the present invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact method, construction and operation shown and described. The spirit and scope of this invention are limited only by the spirit and scope of the following claims.

I claim:

1. A live television game show comprising:
   a. a game show studio, comprising a game show set,
   b. a live studio audience, said live studio audience present in the game show studio,
   c. at least one game host
   d. a plurality of game show contestants
   e. a live TV-viewing audience, comprising a plurality of members of the live TV-viewing audience
   f. at least one prize for at least one member of the plurality of members of the live TV-viewing audience
   g. at least one clue, said at least one clue embedded into the content of the game show and broadcast to the live TV-viewing audience
   g. a step of selection of at least one potential winner out of the plurality of members of the live TV-viewing audience
   h. wherein at least some of the plurality of game show contestants participate in the process of selection of the at least one potential winner out of the plurality of members of the live TV-viewing audience, and
   i. wherein the at least one potential winner out of the plurality of members of the live TV-viewing audience is contacted directly by the show on live TV to confirm that the at least one winner is aware of the at least one clue embedded into the content of the game show and is thus entitled to the at least one prize, and
   i. wherein the step of selection of the at least one potential winner out of the plurality of members of the live TV-viewing audience comprises the generation of a random ID number,
   said random ID number consisting of a preset number of digits, and identifying at least one individual,
   wherein the random ID number is generated by two or more of the plurality of game show contestants
   and wherein the generation of the random ID number occurs during the live broadcast of the game show;
   k. the live television game show further comprising a computer system for analyzing whether the random ID number identifies at least one individual.

2. The live television game show of claim 1, wherein the random ID number comprises the same number of digits as a telephone number.

3. The live television game show of claim 2, further comprising a variable number, and a transforming function, said variable number and said transforming function, applied to each individual digit in the random ID number to transform the random ID number into a new random ID number, said new random ID number having the same number of digits, wherein
   the variable number is an integer, randomly selected, from 1 to 9, and
   the transforming function is a basic mathematical function.

4. The live television game show of claim 3, wherein
   the plurality of game show contestants comprises at least three contestants;
   the at least one clue comprises at least two clues, the clues presented at different times during the live broadcast of the game show, and wherein
   at least one of the at least two clues is a visual clue;
   and wherein
   the mode of contact by which the at least one potential winner out of the plurality of members of the live TV-viewing audience is contacted by the show on live TV is a telephone call.

5. The live television game show of claim 4, further comprising a plurality of mystery envelopes,
   at least some of the mystery envelopes of the plurality of mystery envelopes containing numerical digits inside;
   and wherein at least some of the contestants of the plurality of game show contestants, each randomly select at least one of the mystery envelopes, and place said mystery envelopes in a sequential order, so as to generate the random ID number.

6. The live television game show of claim 2, further comprising a computer system for analyzing the area code portion of the random ID number,
wherein
those digits of the random ID number that are positioned to correspond to the area code portion of a telephone number are analyzed by the computer system and compared against a database of valid area code numbers, and
wherein,
if those digits of the random ID number that are positioned to correspond to the area code portion of a telephone number do not correspond to a valid telephone area code number, then the digits of the random ID number that are positioned to correspond to the area code portion of a telephone number are evaluated as a numerical value by the computer system, and are substituted with a valid telephone area code number with the closest numerical value, and wherein
the resulting substitute random ID number is published.

7. The live television game show of claim 2, further comprising a computer system for analyzing the validity of the random ID number as a telephone number,
said system comprising a database of valid telephone numbers,
wherein
the digits of the random ID number are analyzed by the computer system and compared against the database of valid telephone numbers, and
wherein,
if the random ID number does not correspond to a valid telephone area code number, then
the random ID number is substituted with a valid telephone number that has the closest numerical value to the random ID number, and taken from the database of valid telephone numbers, and wherein
the resulting substitute random ID number is published.

8. The method of playing a live television game show, said game show being of the type comprising:
a game show set,
a live studio audience, said live studio audience present in the game show studio
at least one game host
a plurality of game show contestants
a live TV-viewing audience, comprising a plurality of members of the live TV-viewing audience, at least one prize for at least one member of the plurality of members of the live TV-viewing audience,
at least one clue, said at least one clue embedded into the content of the game show and broadcast to the live TV-viewing audience;
the method comprising the steps of:
a. generating of a random ID number,
said random ID number being generated during the live broadcast of the game show,
said random ID number consisting of a preset number of digits, and identifying at least one potential member of the plurality of members of the live TV-viewing audience,
wherein the random ID number is generated by two or more of the plurality of game show contestants;
b. broadcasting of at least one clue;
c. attempting to contact the at least one potential member of the plurality of members of the live TV-viewing audience identified by the random ID number, said attempt to contact made during the live broadcast of the game show;
d. providing a computer system, said computer system configured for analyzing at least a portion of the random ID number;
e. entering the random ID number into said computer system.

9. The method of claim 8, wherein the step of generating of a random ID number further comprises the steps of:
a. selecting of an at least one contestant out of the plurality of game show contestants,
b. requiring the at least one contestant to generate at least one of the digits of the random ID number,
c. positioning the at least one of the digits of the random ID number in a sequential order during the live broadcast of the game show, so as to form the random ID number.

10. The method of claim 9, wherein the at least one digit generated by the at least one contestant is contained in a mystery envelope, said mystery envelope randomly drawn from a plurality of mystery envelopes by the at least one contestant.

11. The method of claim 9, wherein the game show further comprises a variable number, and a transforming function, the method further comprising the step of,
applying said variable number over the said transforming function to each individual digit in the random ID number to transform the random ID number into a new random ID number, said new random ID number having the same number of digits as the random ID number,
wherein
the variable number is an integer, randomly selected, from 1 to 9, and
the transforming function is a basic mathematical function.

12. The method of claim 11, wherein the random ID number comprises the same number of digits as a telephone number.

13. The method of claim 12, wherein
the plurality of game show contestants comprises at least three contestants;
the at least one clue comprises at least two clues,
the clues are presented at different times during the live broadcast of the game show,
and wherein at least one of the at least two clues is a visual clue;
wherein the mode of contact by which the at least one potential winner out of the plurality of members of the live TV-viewing audience is contacted by the show on live TV is a telephonic call.

14. The method of claim 13, wherein at least some of the mystery envelopes from the plurality of mystery envelopes comprise a wild card, positioned inside of the mystery envelope.

15. The method of claim 12, wherein the attempt to contact the at least one potential member of the plurality of members of the live TV-viewing audience identified by the random ID number is made by a game show computer system.

16. The method of claim 13, further comprising the step of asking the at least one potential member of the plurality of members of the live TV-viewing audience, said member having been identified by the random ID number, a question, concerning the at least two clues.

17. The method of claim 12, further comprising the steps of
providing a computer system for analyzing the area code portion of the random ID number, said computer system comprising a database of valid area code numbers;
entering the random ID number into the computer system;
analyzing, by the computer system, the digits in a section of the random ID number that positionally corresponds to the area code portion of a telephone number and comparing the result against the database of valid area code numbers,
to see whether those digits of the random ID number that are positioned to correspond to the area code portion of a telephone number correspond to a valid telephone area code number,
evaluating the digits of the random ID number that are positioned to correspond to the area code portion of a telephone number as a numerical value by the computer system.

18. The method of claim 17, further comprising the step of substituting
the digits of the random ID number that are positioned to correspond to the area code portion of a telephone number with a valid telephone area code number, said valid telephone area code number taken from the database of valid area code numbers, with the closest numerical value;
further comprising a step of publishing/communicating the resulting substitute random ID number to the live TV-viewing audience.

\* \* \* \* \*